C. P. TAYLOR.
SYSTEM OF CONTROL.
APPLICATION FILED FEB. 24, 1916.
1,363,757.
Patented Dec. 28, 1920.
2 SHEETS—SHEET 1.
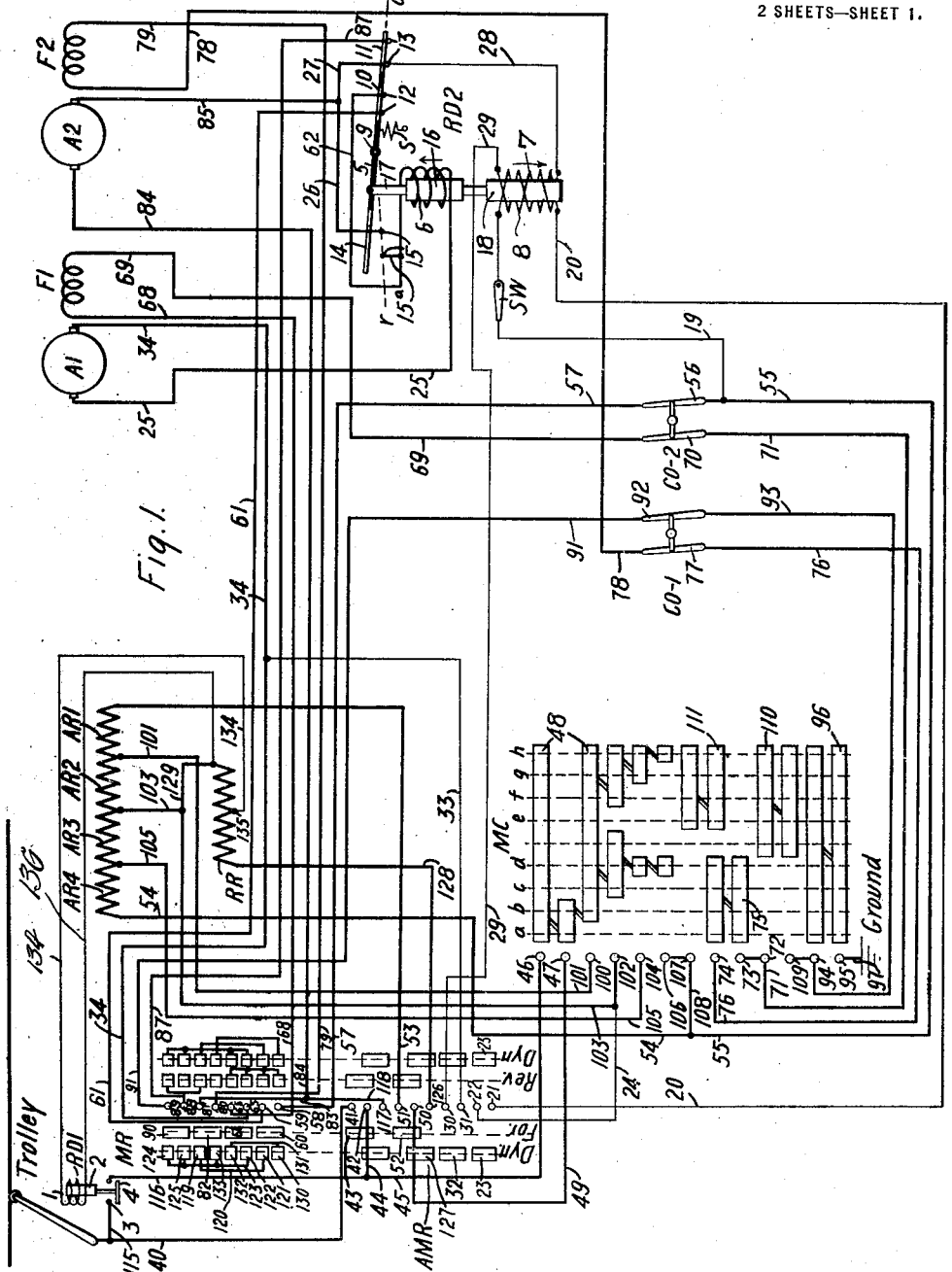
WITNESSES:
Fred A. Lind
W. R. Coley
INVENTOR
Carl P. Taylor
BY
ATTORNEY C. P. TAYLOR.
SYSTEM OF CONTROL.
APPLICATION FILED FEB. 24, 1916.
1,363,757.
Patented Dec. 28, 1920.
2 SHEETS—SHEET 2.
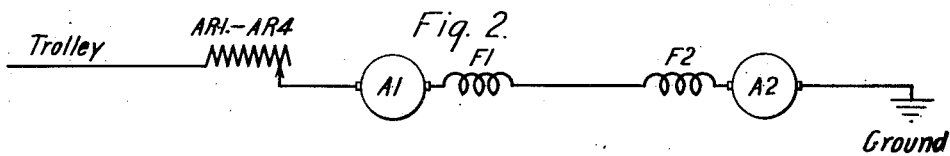
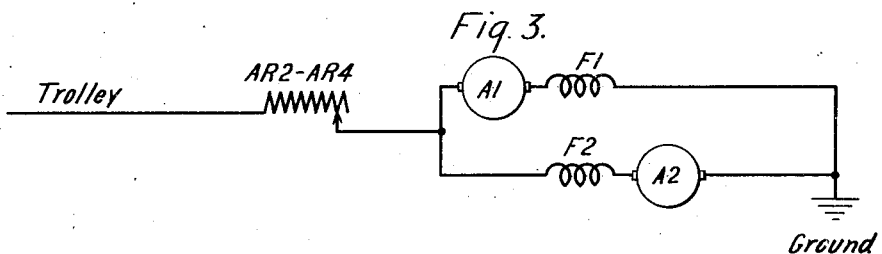
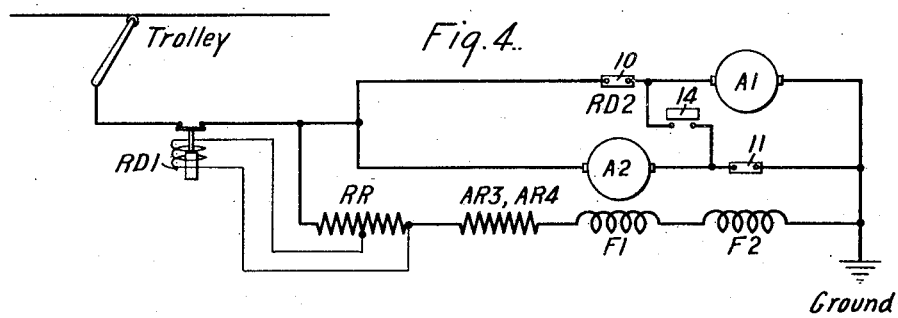
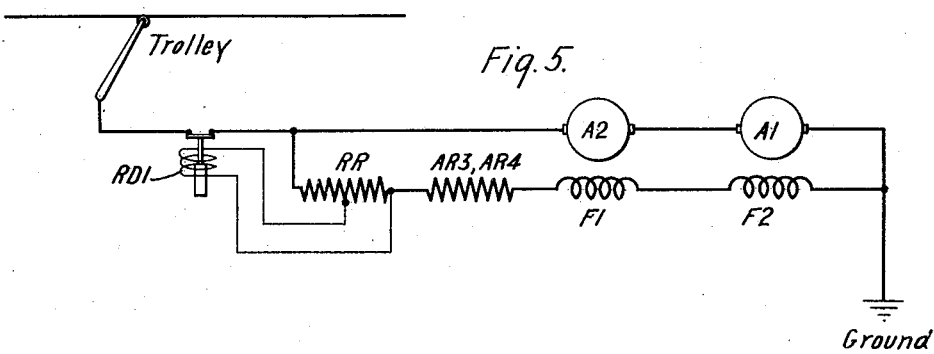
WITNESSES:
Fred. A. Lind
W. R. Coley
INVENTOR
Carl P. Taylor
BY
Wesley G. Carr
ATTORNEY

UNITED STATES PATENT OFFICE.

CARL P. TAYLOR, OF NORFOLK, VIRGINIA, ASSIGNOR TO WESTINGHOUSE ELECTRIC & MANUFACTURING COMPANY, A CORPORATION OF PENNSYLVANIA.

SYSTEM OF CONTROL.

1,363,757.  Specification of Letters Patent.  Patented Dec. 28, 1920.

Application filed February 24, 1916. Serial No. 80,146.

*To all whom it may concern:*

Be it known that I, CARL P. TAYLOR, a citizen of the United States, and a resident of Norfolk, in the county of Norfolk and State of Virginia, have invented a new and useful Improvement in Systems of Control, of which the following is a specification.

My invention relates to systems of control, and especially to the regenerative control of electric railway motors and the like.

One object of my invention is to provide a system of the above-indicated character which shall be relatively simple and inexpensive in construction, which shall be capable of ready adaptation to various standard forms of control systems, and which shall provide the usual advantages of dynamic braking and regenerative control, such as economy of energy and wear of brakes shoes, etc.

Another object of my invention is to provide a simple and reliable type of braking control system wherein the momentum-driven machines are connected in a local circuit under preliminary regenerative conditions and, when the dynamic voltage or current has increased to a predetermined value, the local circuit is automatically connected to return regenerative energy to the supply circuit.

A further object of my invention is to provide a relatively simple and reliable relay means for effecting the above-mentioned automatic connection of the local dynamic braking circuit to the supply circuit, said relay means being also adapted to automatically reëstablish the local braking circuit at the end of the regenerative period.

A still further object of my invention is to provide a system of regenerative control wherein the machine armatures are initially connected in parallel relation across the supply circuit, with the field-winding circuit connected in parallel relation to the armature circuit, and means associated with the above-mentioned relay means for automatically effecting the transition of the motor armatures to series relation when the machine speeds have decreased to a predetermined value.

Another object of my invention is to provide a system of the type under consideration wherein a multi-position switching device embodies means for connecting the machine or machines to the supply circuit when occupying one position that corresponds to acceleration, and for opening the supply-circuit connection when in a second position that corresponds to regeneration, and means for employing the above-mentioned relay means for automatically bridging the opening under suitable circuit conditions.

In the accompanying drawings, Figure 1 is a diagrammatic view of a system of control embodying my invention; Fig. 2 and Fig. 3 are simplified diagrammatic views that illustrate various main-circuit connections during the accelerating period, and Fig. 4 and Fig. 5 are corresponding simplified diagrammatic views that show the main-circuit connections at various times during regeneration.

Referring to Fig. 1 of the drawings, the system shown comprises a plurality of suitable supply-circuit conductors respectively marked " Trolley " and " Ground," although it will be understood that a plurality of metallic-circuit conductors may be employed if desired; a plurality of dynamo-electric machines respectively having armatures A1 and A2 and field windings F1 and F2 of the series type; a main controlling device MC that is adapted to occupy a plurality of operative positions $a$ to $h$, inclusive; a main reversing switch MR for the usual purpose and with which is associated an auxiliary reversing switch AMR, these reversing switches being adapted to occupy the customary forward and reverse positions, respectively marked " For." and " Rev." and, in addition, a plurality of positions marked " Dyn." standing for dynamic, the dynamic positions being respectively located beyond the forward and the reverse positions; a plurality of sections AR1 to AR4, inclusive, of an accelerating resistor; a second resistor RR that is employed during regeneration only for a purpose to be described; a plurality of suitable motor cut-out switches CO—1 and CO—2 for the customary function of excluding the respective motors from circuit whenever necessary or desirable; a relay device RD1 that is employed for connecting the machines to the supply circuit during regeneration, in a manner to be set forth later; and a second relay device RD2 that is employed for automatically effecting the transition of the momentum-driven armatures from parallel to series relation under suitable conditions to be described.

The relay device RD1 is of a familiar type, comprising an actuating coil 1 that is energized from the resistor RR in a manner hereinafter set forth in detail; a movable core member 2 for the actuating coil; and a plurality of coöperating stationary and movable contact members 3 and 4, respectively, for closing a certain regenerative circuit under predetermined conditions.

The relay device RD2 is here shown as comprising an oscillatable rod or bar 5, a biasing series-type coil 6 for normally tending to maintain the bar 5 in its position $a$, as shown in the drawing; a second actuating coil 7 that is connected across the resistor sections AR3 and AR4 during the braking period, as traced in detail later; and a third holding coil 8 that is adapted to be connected across the armature A1 when the bar 5 is actuated to its position $r$ around a central pivotal point 9, as hereinafter set forth.

The bar or rod 5 is provided with a plurality of movable contact members 10 and 11 that respectively engage pairs of stationary contact members 12 and 13 under normal conditions when the rod is biased to the position $a$ by the action of the series coil 6 working in conjunction with a suitable spring $s$, for example; and is further provided with a third movable contact member 14 that is disposed on the opposite side of the pivotal point 9 from the contact members 10 and 11 and is adapted to bridge a pair of stationary contact members 15 when the rod 5 is actuated to its position $r$ by the coil 7, as described later.

The actuating coil 6 is provided with a suitable magnetizable core member 16 that has an extention 17 suitably pivotally associated with the rod 5 intermediate the pivotal point 9 and the contact member 14. A second core member 18 is disposed in alinement with the core member 16, and the actuating coils 7 and 8 are wound around the core member 18. As indicated by the arrows, the coil 6 tends to actuate the core member 16 to its upper position that corresponds to position $a$ of the rod 5, while the coils 7 and 8 tend to pull the coil member 18 to a lower position that corresponds to the position $r$ of the rod 5. The relay device RD2 occupies the position shown throughout the accelerating period and also during the initial portion of the regenerative period when the momentum-driven armatures are connected in parallel relation. The actuation of the rod 5 to the other position $r$ by the coil 7 serves to connect the armatures in series relation, as hereinafter more fully set forth.

The actuating coil 6 is connected in series relation with the main armature A1, as traced in detail later, being thus energized in accordance with the current that traverses the regenerative circuits. The actuating coil 7 is connected across the resistor sections AR3 and AR4 during the regenerative period by reason of the completion of a circuit from the outer terminal of the resistor section AR4 through conductors 54, 55 and 19, a switch SW, the coil 7, conductor 20, control fingers 21 and 22 which are bridged by contact segment 23 of the auxiliary reversing switch AMR in either of its positions that are marked "Dyn.", and conductors 24 and 102 to the inner terminal of the resistor section AR3.

The remaining holding coil 8 is connected from one terminal of the main armature A1 through conductor 25, the actuating coil 6, conductor 15ª, stationary and movable contact members 15 and 14, respectively, when the rod 5 occupies its position $r$, conductors 26 and 27, one of the stationary contact members 13, conductor 28, coil 8, conductor 29, control fingers 30 and 31, which are bridged by contact segment 32 in either of the regenerative positions of the auxiliary reversing switch AMR, and conductors 33 and 34 to the opposite terminal of the armature A1.

The mechanical operation of the relay device RD2, without respect to the various electrical connections that are effected by such operation, may be set forth as follows: When the current traversing the series coil 6 decreases to a predetermined value at the end of that portion of the regenerative period when the armatures are connected in parallel relation, the strength of the coil 7 is sufficient to overcome the combined opposition of the weakened series coil 6 and the spring $s$, thereby actuating the rod 5 to its position $r$. Thereupon, the holding coil 8 is connected in circuit by reason of the bridging of stationary contact members 15 by movable contact member 14 of the rod 5, and the relay device is maintained in its position $r$ throughout the remainder of the regenerative period, even though the coil 7 is subsequently deënergized by reason of the manipulation of the main controller MC to gradually short-circuit the resistor sections AR3 and AR4 as the speed of the momentum-driven machines decreases. However, when the main controller is returned to its off position, the coil 8 is deënergized as soon as the motors come to rest and, consequently, the action of the spring $s$ is sufficient to actuate the rod 5 to its normal position that is shown in the drawing. Although I have thus illustrated and described a specific form of relay device for performing certain functions, it will be understood that any other suitable means for effecting the desired results may be employed.

Assuming that it is desired to effect acceleration of the motors, and that the main reversing switch MR occupies its position "For.", the main controller MC may be moved to its initial operative position $a$, whereupon a circuit is initially established from the trolley, through conductor 40, control fingers 41 and 42 which are bridged by contact segment 43 of the auxiliary reversing switch AMR, conductors 44 and 45, control fingers 46 and 47 which are bridged by contact segment 48 of the main controller in its position $a$, conductor 49, control fingers 50 and 51 which are bridged by contact segment 52 of the auxiliary reversing switch, conductor 53, the four sections AR1 to AR4, inclusive, of the accelerating resistor, conductors 54 and 55, blade 56 of the cutout switch CO—2, conductor 57, control fingers 58 and 59 which are bridged by contact segment 60 of the main reversing switch, conductor 61, coöperating stationary and movable contact members 12 and 10, respectively, of the relay device RD2 in its accelerating positions $a$, conductors 62, actuating coil 6 of the relay device RD2, conductor 25, armature A1, conductor 34, control fingers 65 and 66 which are bridged by contact segment 67 of the main reversing switch, conductor 68, field winding F1, conductor 69, blade 70 of the cutout switch CO—2, conductor 71, control finger 72, control fingers 73 and 74 which are bridged by contact segment 75 of the main controller, conductor 76, blade 77 of the cutout switch CO—1, conductor 78, field winding F2, conductor 79, control fingers 80 and 81 which are bridged by contact segment 82 of the main reversing switch, conductors 83 and 84, armature A2, conductors 85 and 26, coöperating stationary and movable contact members 13 and 11, respectively, of the relay device RD2 in its position $a$, conductor 87, control fingers 88 and 89 which are bridged by contact segment 90 of the main reversing switch, conductor 91, blade 92 of the cutout switch CO—1, conductor 93, control fingers 94 and 95 which are bridged by contact segment 96 of the main controller, and conductor 97 to the negative conductor Ground. The main circuits at this time are illustrated in Fig. 2.

Upon actuation of the main controller MC to its second position $b$, a circuit is completed from the contact segment 48 thereof, through control finger 100, conductor 101, the resistor sections AR2, AR3 and AR4, and thence through the circuit already traced, whereby the section AR1 of the accelerating resistor is excluded from circuit, and a predetermined degree of acceleration of the motors is effected.

Similarly, when the main controller is moved to its position $c$, a circuit is completed from the contact segment 48, through control finger 102 and conductor 103 to a point intermediate the resistor sections AR2 and AR3, thus excluding the section AR2 from the motor circuit. When the main controller is moved to its position $d$, one circuit is established from the contact segment 48, through control finger 104 and conductor 105 to a point intermediate the resistor sections AR3 and AR4; while a further circuit is simultaneously established from the contact segment 48, through control fingers 106 and 107 and conductor 108 to the conductor 55, whereby a direct connection between conductors 45 and 55 is established, and the resistor sections AR3 and AR4 are excluded from circuit to dispose the motors in full series relation.

To effect the transition of the motors from series to parallel relation, which is accomplished by the well-known "shunting" type of transition, the main controller may be actuated from position $d$ toward its initial parallel position $e$. Under such conditions, a circuit is initially established from the conductor 71, which is associated with the low-voltage terminal of the field winding F1, through control fingers 72 and 109 which are bridged by contact segment 110, and thence through control fingers 94 and 95 to the negative conductor Ground, in accordance with the circuit hereinbefore traced, whereby the motor having the armature A2 and the field winding F2 is temporarily short-circuited.

Substantially simultaneously with the establishment of the circuit just recited, the contact segment 75 of the main controller is disengaged from the control fingers 73 and 74, thereby interrupting the circuit connection between the field winding F1 and the field winding F2, or, in other words, interrupting the circuit between the two motors; and as soon as the main controller reaches its position $e$, the control fingers 74 and 107 are bridged by a contact segment 111, thus directly connecting the temporarily short-circuited motor to the low-voltage terminal of the resistor section AR4, as illustrated in a simplified manner in Fig. 3.

By actuating the main controller through its remaining positions $f$, $g$, and $h$, the control fingers 102, 104 and 106 successively engage the contact segment 48, whereby the resistor sections AR2 and AR4 are respectively excluded from circuit in a similar manner to that already described, and the motors are disposed in full parallel relation.

Assuming now that it is desired to effect retardation of the dynamo-electric machines and the associated vehicle, the main reversing switch MR may be actuated to its position marked "Dyn." that is located beyond the forward position, after the main controller has been returned to its "off" position. It will be observed that, by reason of the disengagement of control finger 41 from contact segment 43 of the auxiliary reversing switch AMR, the only possible connection between the dynamo-electric machines and the supply-circuit conductor Trolley, is the circuit from the trolley through conductor 115, the stationary and movable contact members 3 and 4, respectively, of the relay device RD1 as soon as the relay device has been actuated to its upper or closed position, in a manner to be described, and conductor 116, which is directly connected to the conductor 45.

By actuating the main controller MC to its initial position $a$, one circuit is established from the at present deënergized conductor 45, through conductor 44, control fingers 42 and 117 which are bridged by the contact segment 43 of the auxiliary reversing switch AMR, conductors 118 and 83, control finger 81, contact segment 119, conductor 120, contact segment 121 and control finger 59 of the main reversing switch MR, conductor 61, the stationary and movable contact members 12 and 10, respectively, of the relay device RD2 in its position $a$, conductors 62, the actuating coil 6, conductor 25, armature A1, conductor 34, control finger 65, contact segment 122, conductor 123, contact segment 124 and control finger 89 of the main reversing switch, conductor 91, blade 92 of the cutout switch CO—1, conductor 93, control fingers 94 and 95 which are bridged by contact segment 96 of the main controller, and conductor 97 to the negative conductor Ground.

A similar circuit is simultaneously established from the conductor 83, through conductor 84, armature A2, conductors 85 and 27, the stationary and movable contact members 13 and 11, respectively, of the relay device RD2, conductor 87, control finger 88, contact segments 125 and 124 and control finger 89 of the main reversing switch, and thence to the negative conductor Ground, in accordance with the circuit already traced. Thus, the momentum-driven armatures are connected in parallel relation between the lower-voltage terminal of the relay device RD1 and Ground, with the contact members 10, 11 and 14 of the relay device RD2 occupying the relative positions shown in Fig. 4.

The field-winding circuit is completed at the same time from conductor 45, through control fingers 46 and 47 which are bridged by contact segment 48 of the main controller, conductor 49, control fingers 50 and 126 which are bridged by contact segment 127 of the auxiliary reversing switch AMR, conductor 128, the entire resistor RR, conductors 129 and 103, accelerating resistor sections AR3 and AR4, conductors 54 and 55, blade 56 of the cutout switch CO—2, conductor 57, control finger 58, contact segment 130, conductor 131, contact segment 132 and control finger 66 of the main reversing switch MR, conductor 68, field winding F1, conductor 69, blade 70 of the cutout switch CO—2, conductor 71, control finger 72, control fingers 73 and 74 which are bridged by contact segment 75 of the main controller, conductor 76, blade 77 of the cutout switch CO—1, conductor 78, field winding F2, conductor 79, control finger 80, contact segment 133, conductor 123, contact segment 124 and control finger 89 of the main reversing switch MR, and thence to the negative conductor Ground, as hereinbefore set forth. The field windings F1 and F2 are thus connected in series relation with a fixed resistor RR of suitable value and the variable resistor sections AR3 and AR4, across the circuit of the momentum-driven armatures. The resistor sections AR1 and AR2 are not included in circuit for the reason that they are not designed to withstand the relatively long operation that is necessary during the regenerative period, whereas the resistor RR is suitably proportioned for the intended function and the sections AR3 and AR4 have sufficient capacity to permit of their intermittently remaining in circuit as long as necessary.

It will be observed that a local circuit embodying the parallel-connected armatures, and the field windings together with resistors in series relation with the armatures, is thus established, whereby the residual magnetism of the field windings will effect the inauguration and gradual building up of a dynamic braking current, and the vehicle is initially retarded by dynamic braking.

The actuating coil 1 of the relay device RD1 has one terminal connected through conductor 134 to an intermediate point 135 of the resistor RR, while the other terminal of the actuating coil is connected through conductor 136 to the lower-voltage terminal of the resistor. The design of parts is such that upon the traversal of a predetermined current through the field-winding circuit, that corresponds to armature voltages of a slightly higher value than supply-circuit voltage, the voltage drop across the corresponding portion of the resistor RR is sufficient to effect the actuation of the relay device RD1 to its upper or closed position, whereby the above-mentioned conductors 115 and 116 are connected, and the local circuit just referred to is automatically connected to the supply circuit. Thus, the momentum-driven machines are automatically connected to return regenerative energy to the supply circuit, the currents in the armature and field-winding circuits flowing in the same respective directions as during dynamic braking.

When conditions are suitable, that is, when the speed of the machines has decreased a certain amount, if the vehicle is traveling on level track, or when it is desired to vary the velocity of descent if the vehicle is traveling on a down grade, the main controller MC may be actuated as far as its position $d$, whereby the resistor sections AR3 and AR4 are excluded from circuit in the manner described in connection with the acceleration of the motors. It will be understood that any suitable amount of resistance or number of steps for excluding the same from circuit, may be employed.

When the speed of the machines has further decreased to a predetermined value, the relay device RD1 will drop to its open position, thus temporarily disconnecting the supply circuit and the above-mentioned local circuit, and the main controller MC may then be temporarily returned to its initial position $a$. The current then traversing the armature A1 and the actuating coil 6 of the relay device RD2 (by reason of their temporary connection in the local braking circuit), decreases to a value sufficiently low to permit of the actuation of the rod 5 to its position $r$ by the actuating coil 7, which is connected across the resistor sections AR3 and AR4 during regenerative operation, as hereinbefore described. The transition of the armatures from parallel to series relation is thus effected in such a manner that a smooth retardation is insured, since the field winding current at this time equals its minimum value by reason of the fact that the resistor sections AR3, AR4 and RR are all in circuit. The relay device RD2 is subsequently maintained in its position $r$ throughout the braking period, inasmuch as the holding coil 8 is rendered operative as soon as the rod 5 occupies the position $r$, as previously set forth.

The circuit connections that are effected by the operation of the relay device RD2 are clearly shown in Fig. 4, wherein it will be observed that, upon the removal of contact members 10 and 11 from the armature circuits and the inclusion of the contact member 14 therein, a series relation of the armatures A2 and A1 is effected, as illustrated in Fig. 5. The combined armature voltages will thus be greater than the supply-circuit voltage, a dynamic braking current will be continued in the local circuit comprising the armatures and the field windings and whatever resistors are included in circuit, and, upon the traversal of a predetermined current through the field-winding circuit, the relay device RD1 will again be actuated to its upper or closed position, in the manner already set forth, to effect further regeneration.

The field-winding connections remain the same as during multiple regeneration of the armatures, and the field excitation may be varied at will by actuating the main controller as far as its position $d$.

When regenerative operation has been carried as far as possible, that is, when the voltage of the combined armatures A1 and A2 drops below the supply-circuit voltage, the relay device RD1 will drop to its lower or open position, and dynamic braking will again be set up in the local circuit until the vehicle is brought to a standstill or the main controller is moved to its "off" position.

It will be understood that, if desired, instead of connecting the actuating coil of the relay device RD1 across a portion of the resistor RR, such coil may be connected across one of the armatures A1 or A2, and by proper design and proportioning of parts, the operation of the relay may be made substantially identical with that already set forth.

If an equipment of four or more motors is employed, the armatures may be initially connected in parallel and subsequently in series-parallel or series relation, as the machine speeds decrease to effect, in general, the same type of operation that I have already set forth. In such cases, a larger percentage of the kinetic energy of the momentum-driven vehicle will be returned to the supply circuit, inasmuch as the additional field windings will be adapted to replace a portion of the field-circuit resistance that is employed in the two-motor equipment hereinbefore described.

It will thus be seen that I have provided a relatively simple and inexpensive regenerative control system, and the additional apparatus that I employ may be readily and inexpensively associated with various standard forms of control systems. In accordance with my system, dynamic braking is preliminarily effected in connection with the momentum-driven machines, regeneration to the supply circuit is next automatically effected when conditions are suitable therefor, the machine armatures may be automatically changed from parallel to series relation, if desired, and, at the end of the regenerative period, the same relay means that was employed to inaugurate regenerative operation again operates to reëstablish a local dynamic braking circuit which is maintained until the vehicle stops or the local circuit is opened by the train operator.

The function of the switch SW that is connected in circuit with the actuating coil 7 of the relay device RD2 is as follows: to prevent the above mentioned automatic transition of the motor armatures from parallel to series relation, the switch SW may be opened, whereby the coil 7 cannot be energized and the relay device RD2 remains in its position $a$. Thus, automatic change-over from regeneration to dynamic braking will occur by the opening of the relay device RD1, as soon as the regenerative voltage of the parallel-connected armatures decreases below the supply-circuit voltage.

It will be noted that, whereas the main controller MC is actuated to its final position $h$ during acceleration, only the first four positions $a$ to $d$, inclusive, are utilized during the regenerative period. To prevent the train operator from actuating the main controller beyond position $d$, the usual and familiar mechanical interlocking means between the main control drums and the reverse drums of controller of the "K" type may be readily modified to prevent movement of the main controller beyond position $d$ when the main reversing switch MR occupies either of its positions "Dyn.", as will be understood by those skilled in the art, and no further description of such interlocking is deemed necessary.

I desire it to be understood that various modifications of the system herein shown may be effected without departing from the spirit and scope of my invention. For example, instead of the illustrated type of control system, the familiar remotely-controlled type, wherein a plurality of motor-controlling switches are governed through the agency of a master controller, may be utilized, if deemed preferable. Moreover, instead of the auxiliary reversing switch AMF, a three-pole double-throw knife switch may be employed as an equivalent, although, by mechanically associating the auxiliary reversing switch with the main reversing switch MR, the necessity of manually throwing such a knife switch whenever the initial change-over from acceleration to regeneration or vice versa is effected, is obviated, and any mechanical interlocking means between the main reversing switch and such a knife switch is also dispensed with. I desire, therefore, that only such limitations shall be imposed as are indicated in the appended claims.

I claim as my invention:

1. In a system of control, the combination with a supply circuit and a dynamo-electric machine having an armature and a field winding of the series type, of means for connecting said armature and field winding in a local braking circuit under preliminary regenerative conditions, and means dependent upon conditions in said local circuit for automatically connecting said armature and field winding in substantial parallel relation across said supply circuit.

2. In a system of regenerative control, the combination with a supply circuit and a plurality of dynamo-electric machines severally having armatures and field windings, of means for connecting said armatures in parallel relation and said field windings in series relation therewith in an independent local circuit, and means dependent upon conditions in said local circuit for connecting the local circuit to said supply circuit.

3. In a system of regenerative control, the combination with a supply circuit and a plurality of dynamo-electric machines severally having armatures and field windings, of a translating device, means for connecting said armatures in parallel relation and said field windings and translating device in series relation therewith in an independent local circuit, and means directly dependent upon electrical conditions of said translating device for connecting the armature and field-winding circuits in parallel relation across said supply circuit.

4. In a system of regenerative control, the combination with a supply circuit and a plurality of dynamo-electric machines severally having armatures and field windings, of a resistor, means for connecting said armatures in parallel relation and said field windings and resistor in series relation therewith in an independent local circuit, and means for automatically connecting the local circuit to the supply circuit when the current in the local circuit attains a predetermined value.

5. In a system of regenerative control, the combination with a supply circuit and a plurality of dynamo-electric machines severally having armatures and field windings, of means for connecting said armatures in parallel relation and said field windings in series relation therewith in an independent local circuit, and relay means for automatically connecting the local circuit to said supply circuit under predetermined local-circuit conditions.

6. In a system of regenerative control, the combination with a supply circuit and a plurality of dynamo-electric machines severally having armatures and field windings, of a resistor, means for connecting said armatures in parallel relation and said field windings and resistor in series relation therewith in an independent local circuit, and relay means having an actuating coil connected to said resistor for automatically connecting the local circuit to said supply circuit under predetermined local-circuit conditions.

7. In a system of control, the combination with a supply circuit, and a plurality of momentum-driven dynamo-electric machines severally having armatures and field windings, of means for connecting said armatures in parallel relation and said field windings in series relation therewith in an independent local circuit, means dependent upon conditions in said local circuit for automatically connecting the local circuit to said supply circuit with the armatures in parallel relation, and means acting in conjunction with said last means for subsequently automatically connecting said armatures in series relation across the supply circuit.

8. In a system of control, the combination with a supply circuit, and a plurality of momentum-driven dynamo-electric machines severally having armatures and field windings, of a resistor, means for connecting said armatures in parallel relation and said field windings and resistors in series relation therewith in an independent local circuit, relay means dependent upon the current traversing said resistor for automatically connecting the local circuit to said supply circuit, with the armatures in parallel relation, and other relay means dependent upon predetermined circuit conditions for subsequently automatically connecting said armatures in series relation.

9. In a system of control, the combination with a supply circuit, and a plurality of momentum-driven dynamo-electric machines severally having armatures and field windings, of a resistor, a normally independent electrical circuit comprising said armatures in parallel relation, said field windings and said resistor in series relation with said armatures, relay means for automatically connecting the machines to said supply circuit under predetermined electrical conditions in the local circuit, and means, including said relay means, for subsequently connecting said armatures in series relation across the supply circuit.

10. In a system of control, the combination with a supply circuit, and a plurality of momentum-driven dynamo-electric machines severally having armatures and field windings, of a resistor, a normally independent local electrical circuit comprising said armatures in parallel relation, said field windings and said resistor in series relation with said armatures, and relay means for automatically connecting the machines to said supply circuit under predetermined electrical conditions in the local circuit and for automatically reëstablishing said local circuit under subsequent electrical conditions therein.

11. In a system of control, the combination with a supply circuit, and a momentum-driven dynamo-electric machine having an armature and field winding, of means for initially including said machine in an independent local circuit, and means for automatically connecting the machine to said supply circuit under relatively high-speed conditions and for reëstablishing said local circuit under subsequent relatively low-speed conditions.

12. In a system of control, the combination with a supply circuit, and a plurality of momentum-driven dynamo-electric machines severally having armatures and field windings, of means for connecting said armatures in parallel relation and said field windings in series relation therewith in an independent local circuit, relay means for automatically connecting the local circuit to said supply circuit under predetermined local-circuit conditions, and means including said relay means for subsequently automatically connecting said armatures in series relation across the supply circuit, said relay means being also adapted to automatically reëstablish said local circuit at the end of the regenerative period.

13. In a system of control, the combination with a plurality of dynamo-electric machines adapted for both acceleration and regeneration and severally having armatures and field windings, of a controlling device for effecting series-parallel control of the machines, a reversing controlling device for the machines, and means associated with said reversing device for effecting dissimilar arrangements of said armatures and said field windings under predetermined conditions.

14. In a system of control, the combination with a plurality of dynamo-electric machines adapted for both acceleration and regeneration and severally having armatures and field windings, of a controller for effecting series-parallel control of the machines, a reverser for the machines, and contact means associated with said reverser for connecting said armatures in parallel relation and said field windings in series relation therewith during the regenerative period.

15. In a system of regenerative control, the combination with a supply circuit, and a momentum-driven dynamo-electric machine, of single means for automatically effecting dynamic braking conditions at the end of the regenerative period.

16. In a system of regenerative control, the combination with a supply circuit, and a momentum-driven dynamo-electric machine having an armature and a normally series field-winding circuit connected in parallel relation thereto during regeneration, of means for automatically effecting dynamic braking conditions at the end of the regenerative period.

17. In a system of regenerative control, the combination with a supply circuit and a plurality of momentum-driven dynamo-electric machines collectively having parallel-related armatures and field-winding circuits, of relay means for automatically effecting dynamic braking conditions at the end of the regenerative period.

18. In a system of control, the combination with a supply circuit and a dynamo-electric machine having an armature and a field winding, of means for connecting said armature and field winding in a local circuit under preliminary regenerative conditions, means dependent upon conditions in said local circuit for automatically connecting said local circuit to the supply circuit, and means for varying the field excitation under predetermined conditions.

19. In a system of control, the combination with a supply circuit and a dynamo-electric machine having an armature and a field winding, of a resistor, means for connecting said armature, field winding and resistor in a local circuit under preliminary regenerative conditions, means dependent upon conditions in said local circuit for automatically connecting said local circuit to the supply circuit, and means for varying said resistor to maintain a substantially constant regenerated current.

20. In a system of control, the combination with a supply circuit and a plurality of dynamo-electric machines severally having armatures and field windings, of means for connecting said armatures in parallel relation and said field windings in series relation therewith in an independent local circuit, means dependent upon conditions in said local circuit for connecting the local circuit to said supply circuit, and means for varying the field-circuit resistance to maintain a substantially constant regenerated current.

21. In a system of control, the combination with a supply circuit and a dynamo-electric machine, of a multi-position switching device therefor including means for connecting the machine to the supply circuit when in one position and for opening the supply-circuit connection when in another position, and means for automatically bridging the opening under predetermined circuit conditions.

22. In a system of control, the combination with a supply circuit, and a dynamo-electric machine, of a controlling device for governing the acceleration of said machine, a multi-position reversing device for said machine, means associated with said reversing device for conecting said machine and said controlling device to the supply circuit when said reversing device occupies one position and for opening the supply-circuit connection when in another position, and means dependent upon circuit conditions for automatically bridging the opening.

23. In a system of control, the combination with a supply circuit and a dynamo-electric machine adapted for both acceleration and regeneration, of a controlling device for governing the operation of said machine, a multi-position reversing device for said machine, means mechanically associated with said reversing device for connecting said machine and said controlling device to the supply circuit when said reversing device occupies a position corresponding to acceleration and for opening the supply-circuit connection when in a position corresponding to regeneration, and auxiliary means dependent upon circuit conditions for automatically bridging the opening.

24. In a system of control, the combination with a supply circuit, and a plurality of dynamo-electric machines adapted for both acceleration and regeneration and severally having armatures and field windings, of a controlling device for governing the operation of said machines, a multi-position reversing device for said machines embodying means for connecting said armatures and field windings in an independent local circuit under preliminary regenerative conditions, means mechanically associated with said reversing device for connecting said machine and said controlling device to the supply circuit when said reversing device occupies a position corresponding to acceleration and for opening the supply-circuit connection when in a position corresponding to regeneration, whereby said local circuit is initially disconnected from said supply circuit, and auxiliary means dependent upon electrical conditions in said local circuit for automatically bridging the opening to connect the local circuit to the supply circuit.

25. In a system of regenerative control, the combination with a supply circuit and a momentum-driven dynamo-electric machine, of single means for ending regeneration and effecting dynamic braking conditions.

In testimony whereof, I have hereunto subscribed my name this 18th day of February, 1916.

CARL P. TAYLOR.

Witnesses:
C. C. BURKEY,
A. N. WILLIAMSON.